(12) United States Patent
Seo (10) Patent No.: US 7,780,566 B2
(45) Date of Patent: Aug. 24, 2010

(54) 8-SPEED AUTOMATIC TRANSMISSION FOR A VEHICLE

(75) Inventor: Kangsoo Seo, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 492 days.

(21) Appl. No.: 11/949,992

(22) Filed: Dec. 4, 2007

(65) Prior Publication Data

US 2008/0280721 A1 Nov. 13, 2008

(30) Foreign Application Priority Data

May 8, 2007 (KR) .................. 10-2007-0044649

(51) Int. Cl.
*F16H 3/62* (2006.01)
(52) U.S. Cl. ..................................... 475/276
(58) Field of Classification Search ............... 475/275, 475/276, 280, 281, 297, 313, 319, 325
See application file for complete search history.

(56) References Cited

U.S. PATENT DOCUMENTS

| | | | |
|---|---|---|---|
| 7,311,634 B2* | 12/2007 | Shim | 475/275 |
| 2005/0245343 A1* | 11/2005 | Gumpoltsberger | 475/275 |
| 2005/0245344 A1* | 11/2005 | Kayama et al. | 475/275 |

* cited by examiner

*Primary Examiner*—Sherry L Estremsky
*Assistant Examiner*—Edwin A. Young
(74) *Attorney, Agent, or Firm*—Morgan, Lewis & Bockius LLP (57) ABSTRACT

An eight-speed automatic transmission for a vehicle includes a single pinion planetary gear set, a double pinion planetary gear set, a compound planetary gear set, a first clutch, a second clutch, a third clutch, a fourth clutch, a first brake, a second brake, and a one-way clutch. The second clutch and the fourth clutch are disposed between the double pinion planetary gear set and the compound planetary gear set, and a center supporter is formed between the second clutch and the fourth clutch for smoothly supplying hydraulic pressure to the second clutch and the fourth clutch. Therefore, an input shaft may have a small diameter.

3 Claims, 8 Drawing Sheets

|  | C1 | C2 | C3 | C4 | B1 | B2 | OWC |
|---|---|---|---|---|---|---|---|
| 1ST | ● | | | | ○ | | ● |
| 2ND | ● | | | | | ● | |
| 3RD | ● | | | ● | | | |
| 4TH | ● | | ● | | | | |
| 5TH | | | ● | ● | | | |
| 6TH | | ● | ● | | | | |
| 7TH | | | ● | | | ● | |
| 8TH | | | ● | | ● | | |
| R | | | | ● | ● | | |

# 8-SPEED AUTOMATIC TRANSMISSION FOR A VEHICLE

CROSS-REFERENCE TO RELATED APPLICATION

This application claims priority to and the benefit of Korean Patent Application No. 10-2007-0044649, filed in the Korean Intellectual Property Office on May 8, 2007, the entire contents of which are incorporated herein by reference.

BACKGROUND OF THE INVENTION (a) Field of the Invention

The present invention relates to an eight-speed automatic transmission. More particularly, the present invention relates to an eight-speed automatic transmission that includes a center supporter that may smoothly supply hydraulic pressure to clutches, and an input shaft that has a small diameter.

(b) Description of the Related Art

A typical shift mechanism of an automatic transmission utilizes a combination of a plurality of planetary gear sets. A powertrain of such an automatic transmission changes rotating speed and torque received from a torque converter of the automatic transmission and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a powertrain such as durability, efficiency in power transmission, and size depend a lot on the layout of combined planetary gear sets. Therefore, designs for a combining structure of a powertrain are also under constant investigation.

A manual transmission that has too many shift-speeds causes inconvenience of excessively frequent shifting operations to a driver. Therefore, the positive features of more shift-speeds are more important for automatic transmissions because an automatic transmission automatically controls shifting operations basically without needing manual operation.

In addition to various developments regarding four and five speed powertrains, an eight speed automatic transmission has recently been developed.

Figure 1:
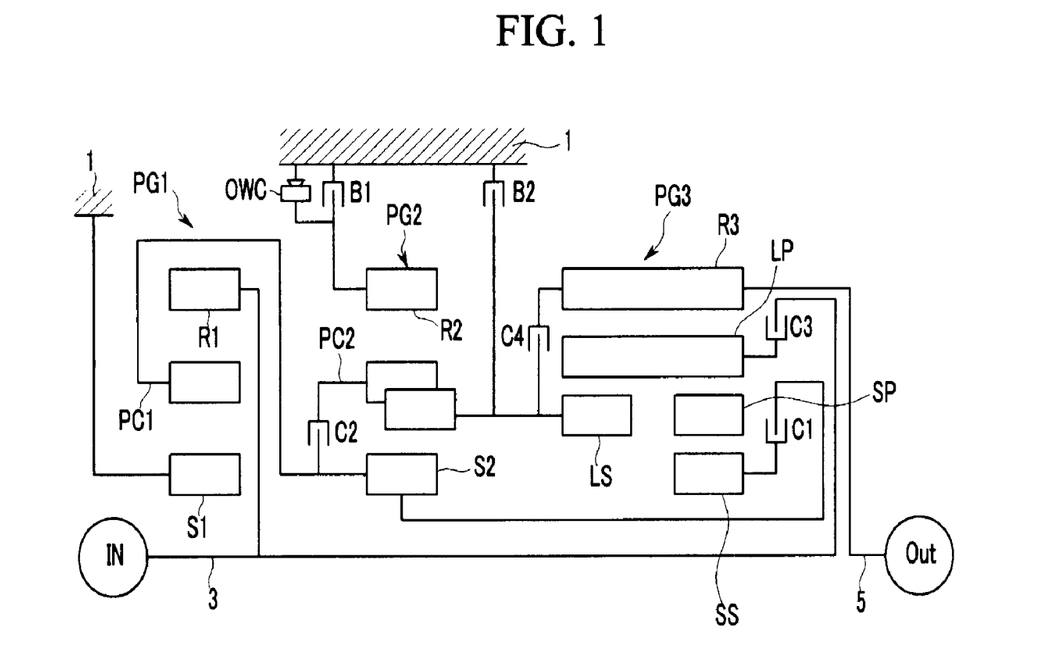
FIG. 1 is a schematic diagram of an eight-speed automatic transmission for a vehicle according to a prior art.
Figure 2:
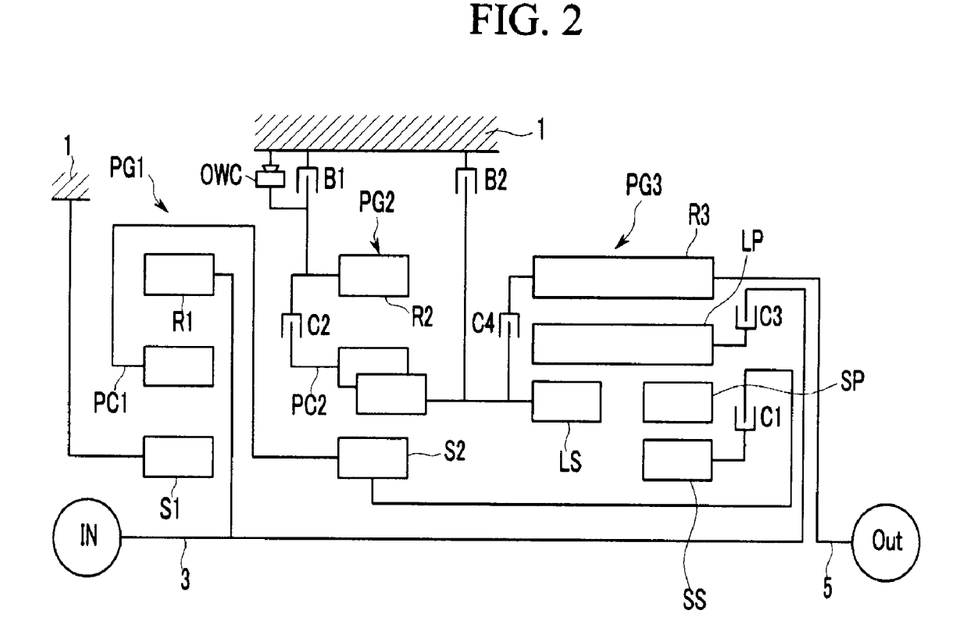
FIG. 2 is a schematic diagram of an eight-speed automatic transmission for a vehicle according to another prior art.

FIG. 1 and FIG. 2 is a schematic diagram of an eight-speed automatic transmission according to a prior art.

In the above scheme, hydraulic pressure is supplied to frictional elements via a hydraulic line formed in an input shaft 3.

An eight-speed automatic transmission, as shown in FIG. 1 and FIG. 2, is provided with three planetary gear sets, four clutches, two brakes, and a plurality of hydraulic lines. In order to supply hydraulic pressure through the input shaft to the frictional elements, the diameter of an input shaft has to be increased so that the size of other elements has to be increased.

The increase of the diameter of the input shaft and the size of the elements leads to increased size and weight of an automatic transmission.

In addition, the hydraulic pressure supplied through the input shaft may be reduced and delay of response can occur because of the hydraulic pressure passages through the rotating elements.

In a case of the conventional eight-speed automatic transmission, as shown in FIG. 1 and FIG. 2, a second clutch C2 and a fourth clutch C4 are disposed between a first planetary gear set PG1 and a second planetary gear set PG2, and the second planetary gear set PG2 and a third planetary gear set PG3 respectively, and the scheme of the automatic transmission is complex, so that it is difficult to form an alternate hydraulic line.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an eight-speed automatic transmission. According to an embodiment of the present invention, a second clutch and a fourth clutch are disposed between a double pinion planetary gear set and a compound planetary gear set, and a center supporter is formed between the second clutch and the fourth clutch for smoothly supplying hydraulic pressure to the second clutch and the fourth clutch. Therefore, an input shaft may have a small diameter so that the size of other elements is decreased.

The eight-speed automatic transmission for a vehicle according to an exemplary embodiment of the present invention may include a single pinion planetary gear set, a double pinion planetary gear set, a compound planetary gear set, a first clutch, a second clutch, a third clutch, a fourth clutch, a first brake, a second brake, and a one-way clutch. The single pinion planetary gear set includes a first ring gear fixedly connected to an input shaft and a first sun gear fixedly connected to a housing and a first planet carrier; the double pinion planetary gear set includes a second ring gear variably fixed to the housing by the first brake and the one-way clutch that are disposed to be parallel, and a second sun gear fixedly connected to the first planet carrier of the single pinion planetary gear set and a second planet carrier variably connected to the second ring gear by the second clutch; the compound planetary gear set includes a short sun gear variably connected to the second sun gear of the double pinion planetary gear set by the first clutch, a short pinion engaged with the short sun gear, a long sun gear fixedly connected to the second planet carrier of the double pinion planetary gear set, a long pinion engaged with the short pinion and the long sun gear and variably connected to the input shaft by the third clutch, and a third ring gear that is engaged with the long pinion, variably connected to the second planet carrier and the long sun gear by the fourth clutch, and connected to an output shaft; the second brake may variably fix the second planet carrier and the long sun gear to the housing; the second clutch and the fourth clutch may be disposed between the double pinion planetary gear set and the compound planetary gear set; and a center supporter may be formed between the second clutch and the fourth clutch for supplying hydraulic pressure to the second clutch and the fourth clutch.

The center supporter may include a center supporter vertical portion that is perpendicular to the input shaft, a center supporter horizontal portion that is parallel to the input shaft, a first hydraulic line formed in the center supporter vertical portion, and a second hydraulic line formed in the center supporter horizontal portion. The second hydraulic line may be connected to a third hydraulic line formed in the center supporter horizontal portion for supplying hydraulic pressure to a second clutch hydraulic chamber and connected to a fourth hydraulic line formed in the center supporter horizontal portion for supplying the hydraulic pressure to a fourth clutch hydraulic chamber.

The second hydraulic line may be connected to a fifth hydraulic line for supplying the hydraulic pressure to a second clutch balance chamber and connected to a sixth hydraulic line for supplying the hydraulic pressure to a fourth clutch balance chamber.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF REFERENCE NUMERALS INDICATING PRIMARY ELEMENTS IN THE DRAWINGS

1: housing 3: input shaft
5: output shaft 10: center supporter
11: center supporter vertical portion 13: first hydraulic line
21: center supporter horizontal portion
23: second hydraulic line
25: third hydraulic line 27: fourth hydraulic line
31: second clutch hydraulic chamber
33: fourth clutch hydraulic chamber
41: second clutch balance chamber 43: fifth hydraulic line
51: fourth clutch balance chamber 53: sixth hydraulic line
PG1: first planetary gear set PG2: second planetary gear set
PG3: third planetary gear set S1: first sun gear
R1: first ring gear PC1: first planet carrier
S2: second sun gear R2: second ring gear PC2: second planet carrier SS: short sun gear
LS: long sun gear SP: short pinion
LP: long pinion PC3: third planet carrier
R3: third ring gear C1: first clutch
C2: second clutch C3: third clutch
C4: fourth clutch B1: first brake
B2: second brake OWC: one-way clutch It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An exemplary embodiment the present invention will be described more fully hereinafter with reference to the accompanying drawings.

Reference numbers shown in FIG. 1 to FIG. 8 will indicate the same elements for ease of understanding.

Figure 3:
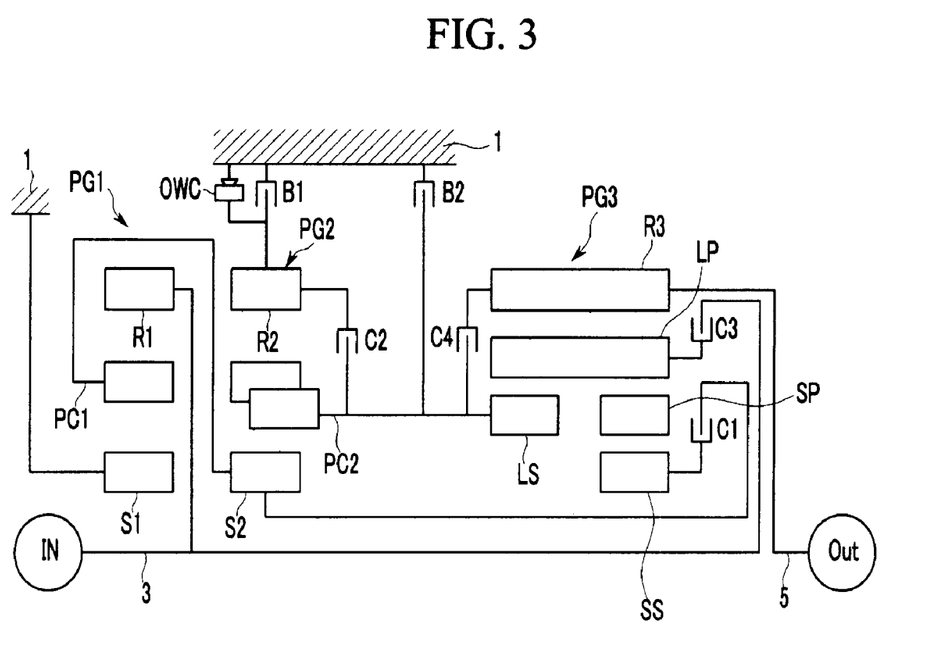
FIG. 3 is a schematic diagram of an eight-speed automatic transmission for a vehicle according to an exemplary embodiment of the present invention.

FIG. 3 is a schematic diagram of an eight-speed automatic transmission for a vehicle according to an exemplary embodiment of the present invention.

An eight-speed automatic transmission for a vehicle of an exemplary embodiment of the present invention, as shown in FIG. 3, includes first, second and third, planetary gear sets PG1, PG2, and PG3, first, second, third, and fourth clutches C1, C2, C3, and C4, first and second brakes B1 and B2, and a one-way clutch OWC.

The first, second, and third planetary gear set PG1, PG2, and PG3 are arranged in the order of the first, the second, and the third planetary gear set PG1, PG2, and PG3 from an input shaft 3.

The first planetary gear set PG1 is formed as a single pinion planetary gear set including a first ring gear R1 fixedly connected the input shaft 3, a first sun gear S1 fixedly connected to a housing 1, and a first planet carrier PC1.

The second planetary gear set PG2 is formed as a double pinion planetary gear set including a second ring gear R2 variably fixed to the housing 1 by the first brake B1 and the one-way clutch OWC that are disposed in parallel, a second sun gear S2 fixedly connected to the first planet carrier PC1 and a second planet carrier PC2 variably connected to the second ring gear R2 by the second clutch C2.

The third planetary gear set PG3 is formed as compound planetary gear set includes a short sun gear SS variably connected to the second sun gear S2 by the first clutch C1, a short pinion SP engaged with the short sun gear SS, a long sun gear LS fixedly connected to the second planet carrier PC2, a long pinion LP engaged with the short pinion SP and the long sun gear LS and variably connected to the input shaft 3 by the third clutch C3, and a third ring gear R3 that is engaged with the long pinion LP, variably connected to the second planet carrier PC2 and the long sun LS by the fourth clutch C4, and fixedly connected to an output shaft 5.

The second brake B2 may variably fix the second planet carrier PC2 and the long sun gear LS to the housing 1.

The second clutch C2 and the fourth clutch C4 are disposed between the second and third planetary gear sets PG2 and PG3.

Figure 4:
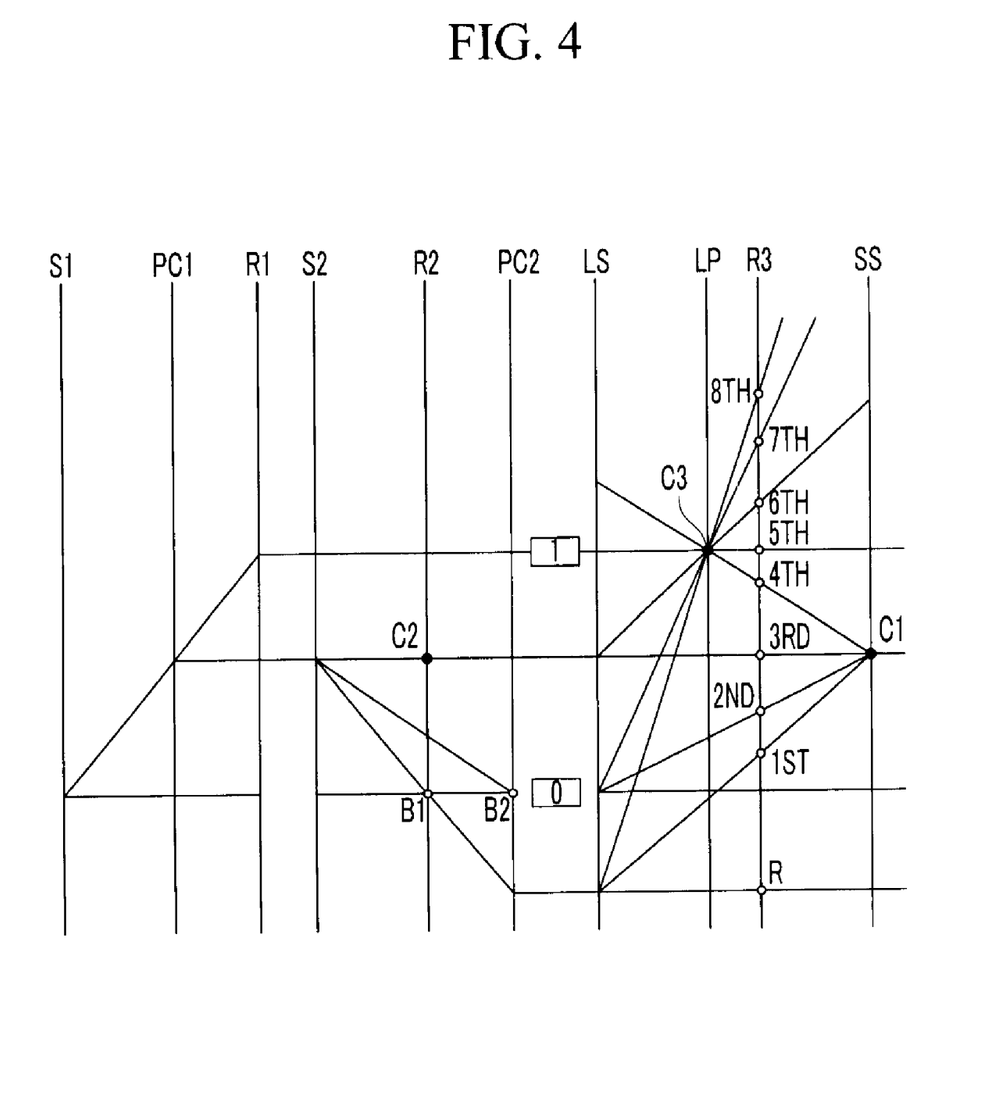
FIG. 4 is a speed diagram of the eight-speed automatic transmission for a vehicle according to the exemplary embodiment of the present invention.
Figure 5:
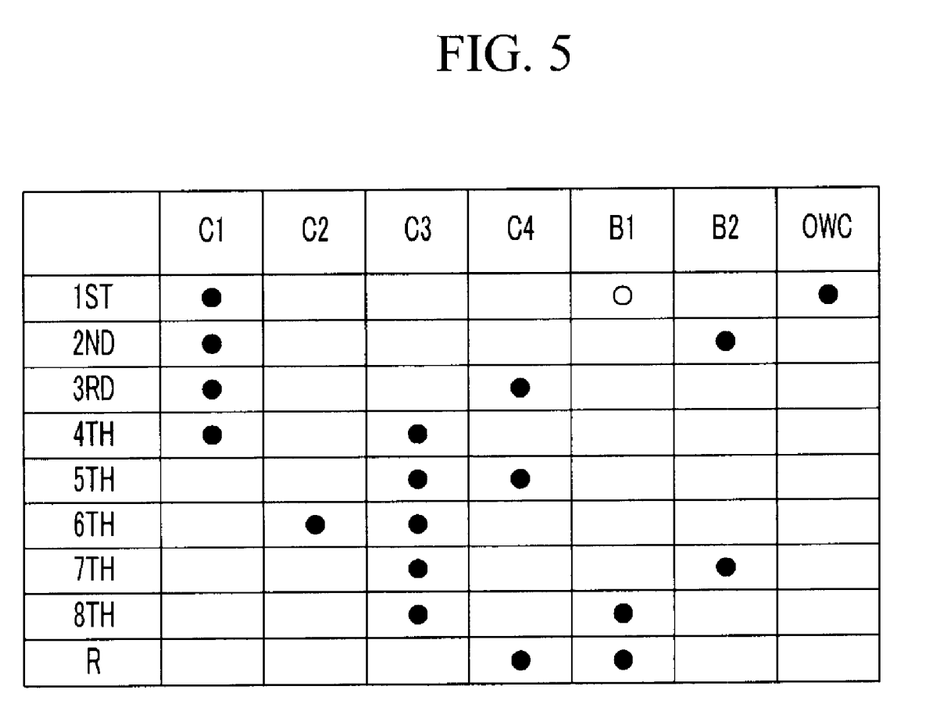
FIG. 5 is an operational chart of the eight-speed automatic transmission for a vehicle according to the exemplary embodiment of the present invention.

A speed diagram and an operational chart of the eight-speed automatic transmission for a vehicle according to the exemplary embodiment of the present invention are shown in FIG. 4 and FIG. 5.

As shown in FIG. 5, the first clutch C1 and the first brake B1 or the first clutch C1 and the one-way clutch OWC are operated for the first forward speed, the first clutch C1 and the second brake B2 are operated for the second forward speed, the first clutch C1 and the fourth clutch C4 are operated for the third forward speed, the first clutch C1 and the third clutch C3 are operated for the fourth forward speed, the third clutch C3 and the fourth clutch C4 are operated for the fifth forward speed, the second clutch C2 and the third clutch C3 are operated for the sixth forward speed, the third clutch C3 and the second brake B2 are operated for the seventh forward speed, the third clutch C3 and the first brake B1 are operated for the eighth forward speed, and the fourth clutch C4 and the first brake B1 are operated for the reverse speed.

Hereinafter, referring to FIG. 4, a shifting operation of the eight-speed automatic transmission for a vehicle according to an embodiment of the present invention will be described in detail.

In FIG. 4, "0" in the horizontal portion line indicates that rotation speed is zero, and "1" means that rotation speed is equal to the rotation speed of the input shaft 3.

The first clutch C1 and the first brake B1 or the first clutch C1 and the one-way clutch OWC are operated for the first forward speed.

Then, the first ring gear R1 receives an input of an engine speed from the input shaft 3, and the first sun gear S1 and the second ring gear R2 act as fixed elements by the housing 1 and the engagement of first brake B1 respectively. In this case, according to cooperative reaction of the first, second, and third planetary gear sets PG1, PG2, and PG3, the first speed line is formed and the output element of the third ring gear R3 rotates at a speed 1ST, and the shifting to the first forward speed is realized.

The first clutch C1 and the second brake B2 are operated for the second forward speed.

Then, the first ring gear R1 receives an input of an engine speed from the input shaft 3, and the first sun gear S1, the second planet carrier PC2, and long sun gear LS act as fixed elements by the engagement of second brake B2. In this case, according to cooperative reaction of the first, second, and third planetary gear sets PG1, PG2, and PG3, the second speed line is formed and the output element of the third ring gear R3 rotates at a speed 2ND, and the shifting to the second forward speed is realized.

The first clutch C1 and the fourth clutch C4 are operated for the third forward speed.

Then, the first ring gear R1 receives an input of an engine from the input shaft 3, and the first sun gear S1 acts as a fixed element by the housing 1. In this case, according to cooperative reaction of the first, second, and third planetary gear sets PG1, PG2, and PG3, the third speed line is formed and the output element of the third ring gear R3 rotates at a speed 3RD, and the shifting to the third forward speed is realized.

The first clutch C1 and the third clutch C3 are operated for the fourth forward speed.

Then, the first ring gear R1 receive an input of an engine from the input shaft 3, and the long pinion LP receives an input of an engine by engagement of clutch C3, and the first sun gear S1 acts as a fixed element by the housing 1. In this case, according to cooperative reaction of the first, second, and third planetary gear sets PG1, PG2, and PG3, the fourth speed line is formed and the output element of the third ring gear R3 rotates at a speed 4TH, and the shifting to the fourth forward speed is realized.

The third clutch C3 and the fourth clutch C4 are operated for the fifth forward speed.

Then, the long pinion LP receives an input of an engine by engagement of the third clutch C3. In this case, according to cooperative reaction of the first, second, and third planetary gear sets PG1, PG2, and PG3, the fifth speed line is formed and the output element of the third ring gear R3 rotates at a speed 5TH, and the shifting to the fifth forward speed is realized.

The second clutch C2 and the third clutch C3 are operated for the sixth forward speed.

Then, the first ring gear R1 receives an input of an engine from the input shaft 3, the long pinion LP receive an input of an engine by engagement of the third clutch C3 and the first sun gear S1 acts as a fixed element by the housing 1. In this case, according to cooperative reaction of the first, second, and third planetary gear sets PG1, PG2, and PG3, the sixth speed line is formed and the output element of the third ring gear R3 rotates at a speed 6TH, and the shifting to the sixth forward speed is realized.

The third clutch C3 and the second brake B2 are operated for the seventh forward speed.

Then, the first ring gear R1 receives an input of an engine from the input shaft 3, the long pinion LP receive an input of an engine by engagement of the third clutch C3, the first sun gear S1 acts as fixed element by the housing 1, the second planet carrier PC2, and the long sun gear LS act as fixed elements by engagement of the second brake B2. In this case, according to cooperative reaction of the first, second, and third planetary gear sets PG1, PG2, and PG3, the seventh speed line is formed and the output element of the third ring gear R3 rotates at a speed 7TH, and the shifting to the seventh forward speed is realized.

The third clutch C3 and the first brake B1 are operated for the eighth forward speed.

Then, the first ring gear R1 receives an input of an engine from the input shaft 3 and the long pinion LP receive an input of an engine by engagement of the third clutch C3, and the second ring gear R2 acts as a fixed element by engagement of the first brake B1. In this case, according to cooperative reaction of the first, second, and third planetary gear sets PG1, PG2, and PG3, the eighth speed line is formed and the output element of the third ring gear R3 rotates at a speed 8TH, and the shifting to the eighth forward speed is realized.

The fourth clutch C4 and the first brake B1 are operated for the reverse speed.

Then, the first ring gear R1 receives an input of an engine from the input shaft 3, and the second ring gear R2 acts as a fixed element by engagement of the first brake B1. In this case, according to cooperative reaction of the first, second, and third planetary gear sets PG1, PG2, and PG3, the reverse speed line is formed and the output element of the third ring gear R3 rotates at a speed R, and the shifting to the reverse speed is realized.

The speed line with respect to the planetary gear set, as described above, is obvious to a person of ordinary skill in the art, so a detailed description thereof will be omitted.

The eight-speed automatic transmission for a vehicle according to the exemplary embodiment of the present invention, as shown in FIG. 3, disposes the second clutch C2 and the fourth clutch C4 between the second planetary gear set PG2 and the third planetary gear set PG3. Therefore, a center supporter 10 for supplying hydraulic pressure to the second clutch C2 and the fourth clutch C4 may be formed between the second clutch C2 and the fourth clutch C4.

Figure 6:
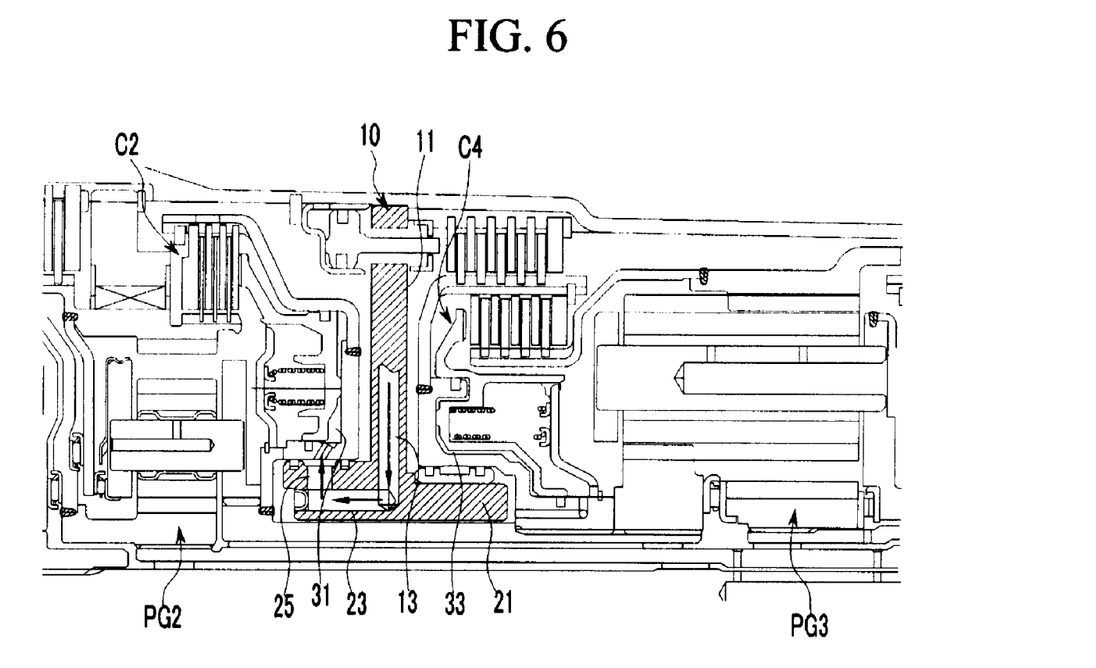
FIG. 6 is a drawing of the eight-speed automatic transmission for a vehicle according to the exemplary embodiment of the present invention that shows supply of hydraulic pressure to a fourth clutch.
Figure 7:
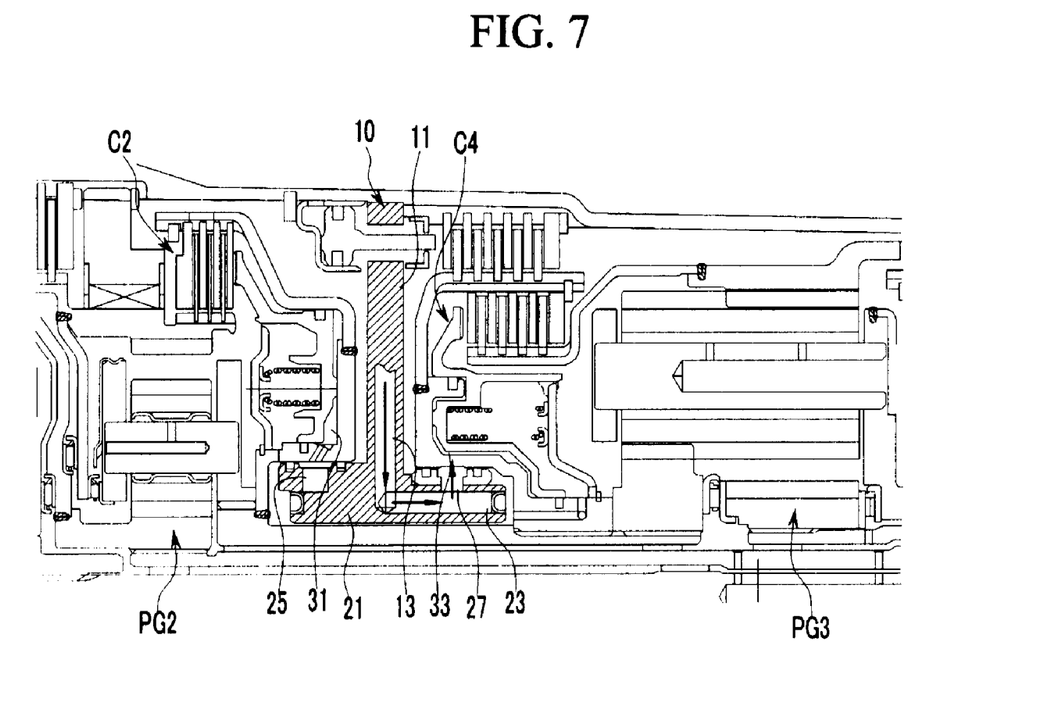
FIG. 7 is a drawing of the eight-speed automatic transmission for a vehicle according to the exemplary embodiment of the present invention that shows supply of hydraulic pressure to a second clutch.
Figure 8:
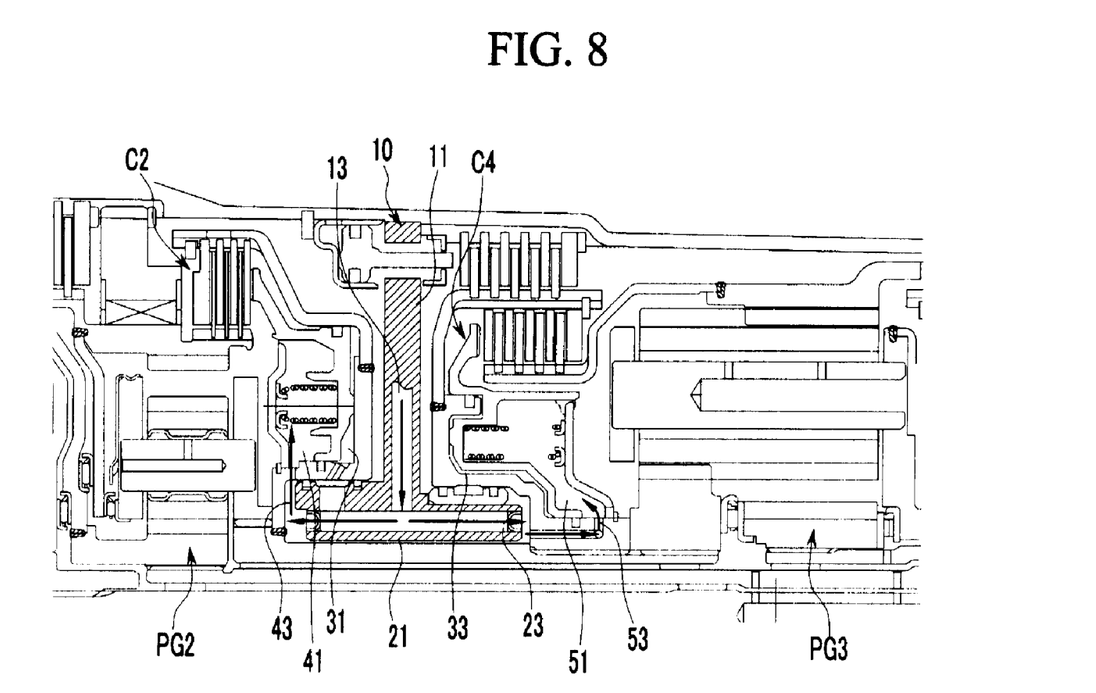
FIG. 8 is a drawing of the eight-speed automatic transmission for a vehicle according to the exemplary embodiment of the present invention that shows supply of hydraulic pressure to second and fourth clutch balance chambers.

The scheme of the eight-speed automatic transmission according to the exemplary embodiment of the present invention that has the center supporter 10 is shown in FIG. 6, FIG. 7, and FIG. 8.

The center supporter 10 includes a center supporter vertical portion 11 that is perpendicular to the input shaft 3 and a center supporter horizontal portion 21 that is parallel to the input shaft 3.

A first hydraulic line 13 is formed in the center supporter vertical portion 11 and a second hydraulic line 23 is formed in the center supporter horizontal portion 21.

The second hydraulic line 23 is connected to a third hydraulic line 25 that is formed in the center supporter horizontal portion 21 for supplying the hydraulic pressure to a second clutch hydraulic chamber 31 that operates the second clutch C2.

Accordingly, the hydraulic pressure can be supplied to the second clutch hydraulic chamber 31 through the first hydraulic line 13, the second hydraulic line 23, and the third hydraulic line 25.

The second hydraulic line, as shown in FIG. 7, is connected to a fourth hydraulic line 27 formed in the center supporter horizontal portion 21 for supplying the hydraulic pressure to a fourth clutch hydraulic chamber 33 that operates the fourth clutch C4.

Accordingly, the hydraulic pressure can be supplied to the fourth clutch hydraulic chamber 33 through the first hydraulic line 13, the second hydraulic line 23, and the fourth hydraulic line 27.

A hydraulic line for supplying hydraulic pressure to a second clutch balance chamber 41 is shown in FIG. 8.

As shown in FIG. 8, a fifth hydraulic line 43 is formed to supply the hydraulic pressure to the second clutch balance chamber 41, and is connected to the second hydraulic line 23.

Accordingly, the hydraulic pressure can be supplied to the second clutch balance chamber 41 through the first hydraulic line 13, the second hydraulic line 23, and the fifth hydraulic line 43.

A sixth hydraulic line 53 is formed to supply hydraulic pressure to a fourth clutch balance chamber 51, and is connected to the second hydraulic line 23.

Accordingly, the hydraulic pressure can be supplied to the fourth clutch balance chamber 51 through the first hydraulic line 13, the second hydraulic line 23, and the sixth hydraulic line 53.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the embodiment of the present invention, the second clutch and the fourth clutch are disposed between the second planetary gear set and the third planetary gear set and the center supporter is formed between the second clutch and the fourth clutch, so that hydraulic pressure can be smoothly supplied to the second clutch and the fourth clutch. Thus, the diameter of the input shaft can be reduced and the entire size and weight of the eight-speed automatic transmission can be reduced.

In addition, since hydraulic pressure is supplied through the center supporter portion, loss of hydraulic pressure and delay of response can be prevented.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. An eight-speed automatic transmission for a vehicle, comprising a single pinion planetary gear set, a double pinion planetary gear set, a compound planetary gear set, a first clutch, a second clutch, a third clutch, a fourth clutch, a first brake, a second brake, and a one-way clutch, wherein the single pinion planetary gear set comprises a first ring gear fixedly connected to an input shaft, a first sun gear fixedly connected to a housing, and a first planet carrier;

the double pinion planetary gear set comprises a second ring gear variably fixed to the housing by the first brake and the one-way clutch that are disposed in parallel, a second sun gear fixedly connected to the first planet carrier, and a second planet carrier variably connected to the second ring gear by the second clutch;

the compound planetary gear set comprises a short sun gear variably connected to the second sun gear by the first clutch, a short pinion engaged with the short sun gear, a long sun gear fixedly connected to the second planet carrier, a long pinion engaged with the short pinion and the long sun gear and variably connected to the input shaft by the third clutch, and a third ring gear that is engaged with the long pinion, variably connected to the second planet carrier and the long sun gear by the fourth clutch, and is connected to an output shaft;

the second brake variably fixes the second planet carrier and the long sun gear to the housing;

the second clutch and the fourth clutch are disposed between the double pinion planetary gear set and the compound planetary gear set; and a center supporter is formed between the second clutch and the fourth clutch for supplying hydraulic pressure to the second clutch and the fourth clutch.

2. The eight-speed automatic transmission for a vehicle of claim 1, wherein the center supporter comprises a center supporter vertical portion that is perpendicular to the input shaft, a center supporter horizontal portion that is parallel to the input shaft, a first hydraulic line formed in the center supporter vertical portion, and a second hydraulic line formed in the center supporter horizontal portion; and the second hydraulic line is connected to a third hydraulic line formed in the center supporter horizontal portion for supplying the hydraulic pressure to a second clutch hydraulic chamber and connected to a fourth hydraulic line formed in the center supporter horizontal portion for supplying the hydraulic pressure to a fourth clutch hydraulic chamber.

3. The eight-speed automatic transmission for a vehicle of claim 2, wherein the second hydraulic line is connected to a fifth hydraulic line for supplying the hydraulic pressure to a second clutch balance chamber and connected to a sixth hydraulic line for supplying the hydraulic pressure to a fourth clutch balance chamber.

* * * * *